(12) United States Patent
Skotheim et al.

(10) Patent No.: US 6,733,924 B1
(45) Date of Patent: May 11, 2004

(54) LITHIUM ANODES FOR ELECTROCHEMICAL CELLS

(75) Inventors: Terje A. Skotheim, Tucson, AZ (US); Christopher J. Sheehan, Tucson, AZ (US); Yuriy V. Mikhaylik, Tucson, AZ (US)

(73) Assignee: Moltech Corporation, Tucson, AZ (US)

( * ) Notice: Subject to any disclaimer, the term of this patent is extended or adjusted under 35 U.S.C. 154(b) by 76 days.

(21) Appl. No.: 09/721,519

(22) Filed: Nov. 21, 2000

Related U.S. Application Data

(60) Provisional application No. 60/167,171, filed on Nov. 23, 1999.

(51) Int. Cl.$^7$ ................................................. H01M 6/14
(52) U.S. Cl. ................................................. 429/231.95
(58) Field of Search .......................... 429/231.95, 215

(56) References Cited

U.S. PATENT DOCUMENTS

| | | | |
|---|---|---|---|
| 4,664,991 A | | 5/1987 | Perichaud et al. |
| 4,739,018 A | | 4/1988 | Armand et al. |
| 4,833,048 A | | 5/1989 | Dejonghe et al. |
| 4,917,974 A | | 4/1990 | Dejonghe et al. |
| 4,954,371 A | | 9/1990 | Yializis |
| 5,037,712 A | * | 8/1991 | Shackle et al. ............. 429/312 |
| 5,162,175 A | | 11/1992 | Visco et al. |
| 5,194,341 A | | 3/1993 | Bagley et al. |
| 5,314,765 A | | 5/1994 | Bates |
| 5,324,599 A | | 6/1994 | Oyama et al. |
| 5,366,829 A | | 11/1994 | Saidi |
| 5,387,479 A | | 2/1995 | Koksbang |
| 5,415,954 A | | 5/1995 | Gauthier et al. |
| 5,429,891 A | * | 7/1995 | Gozdz et al. ............... 429/316 |
| 5,434,021 A | | 7/1995 | Fauteux et al. |
| 5,435,054 A | * | 7/1995 | Tonder et al. ............. 29/623.5 |
| 5,436,091 A | * | 7/1995 | Shackle et al. ............. 429/304 |
| 5,441,831 A | | 8/1995 | Okamoto et al. |
| 5,460,905 A | | 10/1995 | Skotheim |
| 5,462,566 A | | 10/1995 | Skotheim |
| 5,487,959 A | | 1/1996 | Koksbang |
| 5,516,598 A | | 5/1996 | Visco et al. |
| 5,529,860 A | | 6/1996 | Skotheim et al. |
| 5,538,812 A | | 7/1996 | Lee et al. |
| 5,569,520 A | | 10/1996 | Bates |
| 5,601,947 A | | 2/1997 | Skotheim et al. |
| 5,648,187 A | | 7/1997 | Skotheim |
| 5,681,615 A | | 10/1997 | Affinito et al. |
| 5,690,702 A | | 11/1997 | Skotheim et al. |
| 5,723,230 A | | 3/1998 | Naoi et al. |
| 5,731,104 A | | 3/1998 | Ventura et al. |
| 5,783,330 A | | 7/1998 | Naoi et al. |
| 5,792,575 A | | 8/1998 | Naoi et al. |
| 5,824,434 A | | 10/1998 | Kawakami et al. |
| 5,882,819 A | | 3/1999 | Naoi et al. |
| 5,961,672 A | | 10/1999 | Skotheim et al. |
| 6,025,094 A | | 2/2000 | Visco et al. |
| 6,030,726 A | * | 2/2000 | Takeuchi et al. ......... 429/231.8 |
| 6,117,590 A | | 9/2000 | Skotheim et al. |
| 6,153,337 A | | 11/2000 | Carlson et al. |
| 6,183,901 B1 | | 2/2001 | Ying et al. |
| 6,201,100 B1 | | 3/2001 | Gorkovenko et al. |
| 6,402,795 B1 | * | 6/2002 | Chu et al. .................. 29/623.5 |

FOREIGN PATENT DOCUMENTS

| | | |
|---|---|---|
| WO | WO 97/44840 | 11/1997 |
| WO | WO 99/33125 | 7/1999 |
| WO | WO 01/39302 | 5/2001 |

OTHER PUBLICATIONS

Alamgir et al. "Room Temperature Polymer Electrolytes", *Lithium Batteries, New Materials, Developments and Perspectives*, Chapter 3, pp. 96–136, Elsevier, Amsterdam (1994). No month.

Dominey. "Current State of the Art on Lithium Battery Electrolytes", *Lithium Batteries, New Materials, Developments and Perspectives*, Chapter 4, pp. 137–165, Elsevier, Amsterdam (1994). No month.

* cited by examiner

*Primary Examiner*—Susy Tsang-Foster
(74) *Attorney, Agent, or Firm*—Jacqueline M. Nicol; David E. Rogers; Squire, Sanders & Dempsey L.L.P.

(57) ABSTRACT

Provided are lithium anodes for use in electrochemical cells, where the anode active layer has a first layer comprising lithium metal and a second layer of a temporary protective material, wherein the temporary protective material is a metal capable of forming an alloy with lithium metal or is capable of diffusing into lithium metal. The present invention also pertains to electrochemical cells comprising such anodes.

32 Claims, No Drawings

LITHIUM ANODES FOR ELECTROCHEMICAL CELLS

RELATED APPLICATION

This application claims priority to U.S. Provisional Patent Application Ser. No. 60/167,171, filed 23 Nov. 1999, the disclosure of which is incorporated herein by reference for all purposes.

TECHNICAL FIELD

The present invention relates generally to the field of lithium anodes for use in electrochemical cells. More particularly, the present invention pertains to an anode for use in an electrochemical cell comprising a first layer comprising lithium metal and a second layer of a temporary protective metal. The present invention also pertains to methods of forming such anodes, electrochemical cells comprising such anodes, and methods of making such cells.

BACKGROUND

Throughout this application, various publications, patents, and published patent applications are referred to by an identifying citation. The disclosures of the publications, patents, and published patent specifications referenced in this application are hereby incorporated by reference into the present disclosure to more fully describe the state of the art to which this invention pertains.

There has been considerable interest in recent years in developing high energy density batteries with lithium containing anodes. Lithium metal is particularly attractive as the anode of electrochemical cells because of its extremely light weight and high energy density, compared for example to anodes, such as lithium intercalated carbon anodes, where the presence of non-electroactive materials increases the weight and volume of the anode, thereby reducing the energy density of the cells, and to other electrochemical systems with, for example, nickel or cadmium electrodes. Lithium metal anodes, or those comprising mainly lithium metal, provide an opportunity to construct cells which are lighter in weight, and which have a higher energy density than cells such as lithium-ion, nickel metal hydride or nickel-cadmium cells. These features are highly desirable for batteries for portable electronic devices such as cellular phones and laptop computers where a premium is paid for low weight. Unfortunately, the reactivity of lithium and the associated cycle life, dendrite formation, electrolyte compatibility, fabrication and safety problems have hindered the commercialization of lithium cells.

The separation of a lithium anode from the electrolyte of the cell is desirable for reasons including the prevention of dendrites during recharging, reaction with the electrolyte, and cycle life. For example, reactions of lithium anodes with the electrolyte may result in the formation of resistive film barriers on the anode. This film barrier increases the internal resistance of the battery and lowers the amount of current capable of being supplied by the battery at the rated voltage.

Many different solutions have been proposed for the protection of lithium anodes including coating the lithium anode with interfacial or protective layers formed from polymers, ceramics, or glasses, the important characteristic of such interfacial or protective layers being to conduct lithium ions. For example, U.S. Pat. Nos. 5,460,905 and 5,462,566 to Skotheim describe a film of an n-doped conjugated polymer interposed between the alkali metal anode and the electrolyte. U.S. Pat. No. 5,648,187 to Skotheim and U.S. Pat. No. 5,961,672 to Skotheim et al. describe an electrically conducting crosslinked polymer film interposed between the lithium anode and the electrolyte, and methods of making the same, where the crosslinked polymer film is capable of transmitting lithium ions. U.S. Pat. No. 5,314,765 to Bates describes a thin layer of a lithium ion conducting ceramic coating between the anode and the electrolyte. Yet further examples of interfacial films for lithium containing anodes are described, for example, in: U.S. Pat. Nos. 5,387,497 and 5,487,959 to Koksbang; U.S. Pat. No. 4,917,975 to De Jonghe et al.; U.S. Pat. No. 5,434,021 to Fauteux et al.; U.S. Pat. No. 5,824,434 to Kawakami et al.; and U.S. Pat. No. 6,025,094 to Visco et al.

The reactivity of lithium can be a hindrance to the deposition of interfacial or protective layers on lithium surfaces. For example, during deposition of a protective layer reactions between the protective layer precursors or materials and the lithium surface may occur. Although, this may be desirable for some protective layers, in other cases this has undesirable results, for example, increasing the resistance of the interfacial layer or changing the desired morphology of the deposited layer. This is a particular concern when the lithium layer is very thin, for example, below 25 microns in thickness, as is highly desirable in cells with a thin film design where excess lithium is kept to a minimum to reduce unnecessary weight and volume in order to provide cells with higher energy and volumetric capacities.

Despite the various approaches proposed for methods for forming lithium anodes and the formation of interfacial or protective layers, there remains a need for improved methods, which will allow for increased ease of fabrication of cells, while providing for cells with long cycle life and high energy density.

SUMMARY OF THE INVENTION

The anode of the present invention for use in an electrochemical cell, comprises an anode active layer, which anode active layer comprises: (i) a first layer comprising lithium metal; and (ii) a second layer of a temporary protective material in contact with a surface of the first layer. In one embodiment, the temporary protective material is a temporary protective metal that is capable of forming an alloy with lithium metal or is capable of diffusing into lithium metal.

In one embodiment, the temporary protective metal is selected from the group consisting of copper, magnesium, aluminum, silver, gold, lead, cadmium, bismuth, indium, germanium, gallium, zinc, tin, and platinum. In one embodiment, the temporary protective metal is copper.

In one embodiment, the thickness of the first layer is 2 to 100 microns.

In one embodiment, the thickness of the second layer is 5 to 500 nanometers. In one embodiment, the thickness of the second layer is 20 to 200 nanometers.

In one embodiment, the anode further comprises a substrate, wherein the substrate is in contact with a surface of the first layer on the side opposite to the second layer. In one embodiment, the substrate comprises a current collector. In one embodiment, the substrate is selected from the group consisting of metal foils, polymer films, metallized polymer films, electrically conductive polymer films, polymer films having an electrically conductive coating, electrically conductive polymer films having an electrically conductive metal coating, and polymer films having conductive particles dispersed therein.

In one embodiment, the anode further comprises a third layer, the third layer comprising a single ion conducting layer, wherein the third layer is in contact with the second layer on the side opposite to the first layer. In one embodiment, the single ion conducting layer of the third layer comprises a glass selected from the group consisting of lithium silicates, lithium borates, lithium aluminates, lithium, phosphates, lithium phosphorus oxynitrides, lithium silicosulfides, lithium germanosulfides, lithium lanthanum oxides, lithium tantalum oxides, lithium niobium oxides, lithium titanium oxides, lithium borosulfides, lithium aluminosulfides, and lithium phosphosulfides and combinations thereof. In one embodiment, the third layer is a lithium phosphorus oxynitride.

In another embodiment, the anode further comprises a third layer, the third layer comprising a polymer, and wherein the third layer is in contact with the second layer on the side opposite to the first layer. In one embodiment, the polymer of the third layer is selected from the group consisting of electrically conductive polymers, ionically conductive polymers, sulfonated polymers, and hydrocarbon polymers. In one embodiment, the electrically conductive polymer is selected from the group consisting of poly(p-phenylene), polyacetylene, poly(phenylenevinylene), polyazulene, poly(perinaphthalene), polyacenes, and poly(naphthalene-2,6-diyl). In one embodiment, the polymer of the third layer is a crosslinked polymer.

In one embodiment, the anode further comprises a fourth layer, wherein the fourth layer is in contact with the third layer on the side opposite to the second layer. In one embodiment, the fourth layer comprises a polymer. In one embodiment, the polymer of the fourth layer is selected from the group consisting of electrically conductive polymers, ionically conductive polymers, sulfonated polymers, and hydrocarbon polymers. In one embodiment, the polymer of the fourth layer is a crosslinked polymer. In one embodiment, the fourth layer comprise a metal.

In one embodiment, the thickness of the third layer is in the range of 5 to 5000 nanometers. In one embodiment, the thickness of the fourth layer is in the range of 5 to 5000 nanometers.

Another aspect of the present invention pertains to methods of preparing an anode for use in an electrochemical cell, wherein the anode comprising an anode active layer, as described herein, is formed by the steps of:

(a) depositing onto a substrate, as described herein, a first layer comprising lithium metal, as described herein; and (b) depositing over the first layer a second layer of a temporary protective metal, as described herein;

wherein the temporary protective metal is capable of forming an alloy with lithium metal or is capable of diffusing into lithium metal.

In one embodiment, the temporary protective metal is selected from the group consisting of copper, magnesium, aluminum, silver, gold, lead, cadmium, bismuth, indium, germanium, gallium, zinc, tin, and platinum.

In one embodiment, the first layer is deposited in step (a) by a method selected from the group consisting of thermal evaporation, sputtering, jet vapor deposition, laser ablation, and extrusion.

In one embodiment, the second layer is deposited in step (b) by a method selected from the group consisting of thermal evaporation, sputtering, jet vapor deposition, and laser ablation.

In one embodiment, the method comprises after step (b), a step (c) of depositing a third layer comprising a single ion conducting layer, as described herein, over the second layer.

In one embodiment, the third layer is deposited by a method selected from the group consisting of sputtering, thermal evaporation, laser ablation, chemical vapor deposition, and jet vapor deposition.

In another embodiment, the method comprises after step (b), a step (c) of depositing a third layer comprising a polymer, as described herein, over the second layer. In one embodiment, the third layer is deposited by a method selected from the group consisting of thermal evaporation, sputtering, laser ablation, chemical vapor deposition, and jet vapor deposition. In one embodiment, the polymer of the third layer is deposited by the method of flash evaporation.

In another embodiment, the method of the present invention comprises, after step (c), a step (d) of depositing a fourth layer, wherein said fourth layer comprises a polymer. In one embodiment, the fourth layer is deposited by a method selected from the group consisting of thermal evaporation, sputtering, laser ablation, chemical vapor deposition, and jet vapor deposition. In one embodiment, the polymer of the fourth layer is deposited by the method of flash evaporation.

A further aspect of the present invention pertains to an electrochemical cell comprising:

(a) a cathode comprising a cathode active material;

(b) an anode; and (c) a non-aqueous electrolyte interposed between the anode and the cathode;

wherein the anode comprises an anode active layer, which anode active layer comprises:

(i) a first layer comprising lithium metal, as described herein; and (ii) a second layer of a temporary protective metal, as described herein, in contact with a surface of the first layer;

wherein the temporary protective metal is capable of forming an alloy with lithium or is capable of diffusing into lithium metal.

In one embodiment, the temporary protective metal is characterized by forming an alloy with, dissolving into, blending with, or diffusing into the lithium metal of the first layer during electrochemical cycling of the cell.

In one embodiment, the temporary protective metal is characterized by forming an alloy with, dissolving in, blending with, or diffusing into the lithium metal of the first layer prior to electrochemical cycling of the cell.

In one embodiment of the cell of the present invention, the anode further comprises a substrate, as described herein.

In one embodiment of the cell of the present invention, the anode further comprises a third layer comprising a single ion conducting layer, as described herein. In one embodiment, the anode further comprises a third layer comprising a polymer, as described herein.

In one embodiment of the cell of the present invention, the electrolyte is selected from the group consisting of liquid electrolytes, solid polymer electrolytes, and gel polymer electrolytes. In one embodiment, the electrolyte comprises a separator selected from the group consisting of polyolefin separators and microporous xerogel layer separators.

In one embodiment of the cell of the present invention, the cathode active material comprises one or more materials selected from the group consisting of electroactive metal chalcogenides, electroactive conductive polymers, and electroactive sulfur-containing materials, and combinations thereof.

In one embodiment, the cathode active material comprises elemental sulfur. In one embodiment, the cathode active material comprises an electroactive sulfur-containing organic polymer, wherein the sulfur-containing organic polymer, in its oxidized state, comprises one or more polysulfide moieties, —$S_m$—, where m is an integer equal to or greater than 3. In one embodiment, the cathode active material comprises an electroactive sulfur-containing organic polymer, wherein the sulfur-containing organic polymer, in its oxidized state, comprises one or more polysulfide moieties, —$S_m^-$, where m is an integer equal to or greater than 3. In one embodiment, the cathode active material comprises an electroactive sulfur-containing organic polymer, wherein the sulfur-containing organic polymer, in its oxidized state, comprises one or more polysulfide moieties, $S_m^{2-}$, where m is an integer equal to or greater than 3.

In one embodiment, the cell is a secondary cell. In one embodiment, the cell is a primary cell.

Another aspect of the present invention pertains to a method for making an electrochemical cell, as described herein, the method comprising the steps of:

(a) providing a cathode comprising a cathode active material, as described herein;

(b) providing an anode, wherein the anode comprises an anode active layer, which anode active layer comprises:
  (i) a first layer comprising lithium metal, as described herein; and
  (ii) a second layer of a temporary protective metal, as described herein, in contact with a surface of said first layer; and (c) providing a non-aqueous electrolyte, as described herein, wherein the electrolyte is interposed between the anode and the cathode;

wherein the temporary protective metal is capable of forming an alloy with lithium metal or is capable of diffusing into lithium metal.

In one embodiment of the methods of making an electrochemical cell, the temporary protective metal is characterized by forming an alloy with, dissolving in, blending with or diffusing into the lithium metal of the first layer during electrochemical cycling of the cell.

In one embodiment of the methods of making an electrochemical cell, the temporary protective metal is characterized by forming an alloy with, dissolving in, blending with or diffusing into the lithium metal of the first layer prior to electrochemical cycling of the cell.

In one embodiment of the methods of making an electrochemical cell, the anode further comprises a third layer, the third layer comprising a material selected from the group consisting of single ion conducting materials, as described herein, and polymers, as described herein, wherein the third layer is in contact with the temporary protective metal layer on the side opposite to the first layer comprising lithium.

In one embodiment of the methods of making an electrochemical cell, the anode comprises a fourth layer, as described herein.

As will be appreciated by one of skill in the art, features of one aspect or embodiment of the invention are also applicable to other aspects or embodiments of the invention.

DETAILED DESCRIPTION OF THE INVENTION

The difficulties encountered by the reactivity of a lithium surface during deposition of, for example, anode stabilizing layers, may, according to the present invention, be solved by depositing over the lithium surface, prior to coating or depositing such a stabilizing or other layer, a layer of a temporary protective material, such as, for example, a temporary protective metal. The temporary protective material layer acts as a barrier layer to protect the lithium surface during deposition of other anode layers. Further, the temporary protective layer may allow transportation of the lithium films from one processing station to the next without undesirable reactions occurring at the lithium surface during, for example, assembly of cells, or the deposition or solvent coating of other layers onto the anode.

One aspect of the present invention pertains to an anode for use in an electrochemical cell, wherein the anode comprises an anode active layer, which anode active layer comprises:

(i) a first layer comprising lithium metal; and
(ii) a second layer of a temporary protective metal in contact with a surface of the first layer;

wherein the temporary protective metal is capable of forming an alloy with lithium metal or is capable of diffusing into lithium metal.

The first layer of the anode of the present invention comprises lithium metal as the anode active material. In one embodiment of the anodes of the present invention, the first layer of the anode active layer of the anode is lithium metal. The lithium metal may be in the form of a lithium metal foil or a thin lithium film that has been deposited on a substrate, as described below. If desirable to the electrochemical properties of the cell, the lithium metal may be in the form of a lithium alloy such as, for example, a lithium-tin alloy or a lithium aluminum alloy.

A temporary protective metal layer is placed in contact with the first layer comprising lithium metal of the anode of the present invention. The temporary protective metal is selected for its ability to form an alloy with, dissolve into, blend with, or diffuse into the lithium metal of the first layer. In one embodiment, the metal of the temporary protective layer is selected from the group consisting of copper, magnesium, aluminum, silver, gold, lead, cadmium, bismuth, indium, germanium, gallium, zinc, tin, and platinum. In a preferred embodiment, the metal of the temporary protective metal layer is copper.

The thickness of the first layer comprising lithium may vary from about 2 to 200 microns. The choice of the thickness will depend on cell design parameters such as the excess amount of lithium desired, cycle life, and the thickness of the cathode electrode. In one embodiment, the thickness of the first layer is in the range of about 2 to 100 microns. In one embodiment, the thickness of the first layer is in the range of about 5 to 50 microns. In one embodiment, the thickness of the first layer is in the range of about 5 to 25 microns. In one embodiment, the thickness of the first layer is in the range of about 10 to 25 microns.

The thickness of the second temporary protective metal layer is selected to provide the necessary protection to the first layer comprising lithium, for example, during subsequent treatments to deposit other anode or cell layers, such as interfacial or protective layers. It is desirable to keep the layer thickness as thin as possible while providing the desired degree of protection so as to not add excess amounts of non-active materials to the cell which would increase the weight of the cell and reduce its energy density. In one embodiment of the present invention, the thickness of the second temporary protective layer is about 5 to 500 nanometers. In one embodiment of the present invention, the thickness of the second temporary protective layer is about 20 to 200 nanometers. In one embodiment of the present invention, the thickness of the second temporary protective layer is about 50 to 200 nanometers. In one embodiment of the present invention, the thickness of the second temporary protective layer is about 100 to 150 nanometers.

The anodes of the present invention may further comprise a substrate. Substrates are useful as a support on which to deposit the first layer comprising the anode active material, and may provide additional stability for handling of thin lithium film anodes during cell fabrication. Further, in the case of conductive substrates, these may also function as a current collector useful in efficiently collecting the electrical current generated throughout the anode and in providing an efficient surface for attachment of the electrical contacts leading to the external circuit. A wide range of substrates for use with anodes are known in the art. Suitable substrates include, but are not limited to, those selected from the group consisting of metal foils, polymer films, metallized polymer films, electrically conductive polymer films, polymer films having an electrically conductive coating, electrically conductive polymer films having an electrically conductive metal coating, and polymer films having conductive particles dispersed therein. In one embodiment, the substrate is a metallized polymer film.

The anodes of the present invention are especially desirable when an interfacial layer of some type is desired between the lithium surface and the electrolyte. For example, when a single ion conducting layer is desired at the lithium interface, it is preferable to deposit this layer directly on the lithium surface. The precursors to or components of such an interfacial layer may react with the lithium to produce undesirable by-products or result in undesirable changes in morphology of the layers. By depositing a temporary protective metal layer on the lithium surface prior to depositing the interfacial layer, side reactions at the lithium surface may be eliminated or significantly reduced. For example, when an interfacial film of a lithium phosphorus oxynitride, as described in U.S. Pat. No. 5,314,765 to Bates, is deposited in a nitrogen atmosphere by sputtering of $Li_3PO_4$ onto a lithium surface, the nitrogen gas may react with lithium to form lithium nitride ($LiN_3$) at the anode surface. By depositing a layer of a temporary protective metal, for example, copper over the lithium surface, the interfacial layer may be formed without the formation of lithium nitride.

In one embodiment of the present invention, the anode comprises a third layer, which third layer is in contact with a surface of the second layer, where the second layer is a temporary protective metal layer, on the side opposite to the first layer, where the first layer comprises lithium metal. This third layer may function as an interfacial layer, for example, as an anode stabilizing or as an anode protective layer between the anode active layer and the electrolyte of the cell. In one embodiment, the third layer is a single ion conducting layer. In one embodiment, the third layer comprises a polymer. Other types of interfacial or protective layers may also be deposited as a third layer as are known in the art.

Examples of single ion conducting layers include, but are not limited to, inorganic, organic, and mixed organic-inorganic polymeric materials. The term "single ion conducting layer," as used herein, pertains to a layer which selectively or exclusively allows passage of singly charge cations. Single ion conducting layers have the capability of selectively or exclusively transporting cations, such as lithium ions, and may comprise polymers such as, for example, disclosed in U.S. Pat. No. 5,731,104 to Ventura, et al. In one embodiment, the single ion conducting layer comprises a single ion conducting glass conductive to lithium ions. Among the suitable glasses are those that may be characterized as containing a "modifier" portion and a "network" portion, as known in the art. The modifier is typically a metal oxide of the metal ion conductive in the glass. The network former is typically a metal chalcogenide, such as for example, a metal oxide or sulfide.

Suitable single ion conducting layers include, but are not limited to, glassy layers comprising a glassy material selected from the group consisting of lithium silicates, lithium borates, lithium aluminates, lithium phosphates, lithium phosphorus oxynitrides, lithium silicosulfides, lithium germanosulfides, lithium lanthanum oxides, lithium titanium oxides, lithium borosulfides, lithium aluminosulfides, and lithium phosphosulfides, and combinations thereof. In a preferred embodiment, the single ion conducting layer comprises a lithium phosphorus oxynitride. Electrolyte films of lithium phosphorus oxynitride are disclosed, for example, in U.S. Pat. No. 5,569,520 to Bates. A thin film layer of lithium phosphorus oxynitride interposed between a lithium anode and an electrolyte is disclosed, for example, in U.S. Pat. No. 5,314,765 to Bates. The selection of the single ion conducting layer will be dependent on a number of factors including, but not limited to, the properties of electrolyte and cathode used in the cell.

In one embodiment, the third layer of the anode comprises a polymer selected from the group consisting of electrically conductive polymers, ionically conductive polymers, sulfonated polymers, and hydrocarbon polymers. The selection of the polymer will be dependent on a number of factors including, but not limited to, the properties of electrolyte and cathode used in the cell.

In one embodiment, the polymer of the third layer comprises an electrically conductive polymer. Examples of suitable electrically conductive polymers include, but are not limited to, those described in U.S. Pat. No. 5,648,187 to Skotheim, for example, including, but not limited to, poly (p-phenylene), polyacetylene, poly(phenylenevinylene), polyazulene, poly(perinaphthalene), polyacenes, and poly (naphthalene-2,6-diyl).

In one embodiment, the polymer of the third layer comprises an ionically conductive polymer. Examples of suitable ionically conductive polymers include, but are not limited to, ionically conductive polymers known to be useful in solid polymer electrolytes and gel polymer electrolytes for lithium electrochemical cells, such as, for example, polyethylene oxides.

In one embodiment, the polymer of the third layer comprises a sulfonated polymer. Examples of suitable sulfonated polymers include, but are not limited to, sulfonated siloxane polymers, sulfonated polystyrene-ethylene-butylene polymers, and sulfonated polystyrene polymers.

In one embodiment, the polymer of the third layer comprises a hydrocarbon polymer. Examples of suitable hydrocarbon polymers include, but are not limited to, ethylene-propylene polymers, polystyrene polymers, and the like.

Also preferred for the polymer of the third layer are crosslinked polymer materials formed from the polymerization of monomers including, but not limited to, alkyl acrylates, glycol acrylates, polyglycol acrylates, polyglycol vinyl ethers, polyglycol divinyl ethers, and those described in U.S. patent application Ser. No. 09/399,967 now U.S. Pat. No. 6,183,901 to Ying et al. of the common assignee for protective coating layers for separator layers. For example, one such crosslinked polymer material is a polydivinyl-poly (ethyleneglycol). Other crosslinked polymers, include for example, those described in U.S. Pat. No. 5,648,187 to Skotheim. In one embodiment, the polymer of the third layer is a crosslinked polymer.

The thickness of the third layer of the anode of the present invention may vary over a wide range from about 5 nanometers to about 5000 nanometers, and is dependent on the thickness of the layer required to provide the desired beneficial effect of the layer while maintaining properties needed for cell construction, such as flexibility and low interfacial resistance. In one embodiment, the thickness of the third layer is in the range of about 10 nanometers to 2000 nanometers. In one embodiment, the thickness of the third layer is in the range of about 10 nanometers to 1000 nanometers. In one embodiment, the thickness of the third layer is in the range of about 50 nanometers to 1000 nanometers. In one embodiment, the thickness of the third layer is in the range of about 100 nanometers to 500 nanometers.

The anode of the present invention may further comprise a fourth layer, wherein the fourth layer is in contact with the third layer on the side opposite to the second layer. Such a combination of two different layers is often referred to as a bi-layer or a multi-layer structure. A fourth layer may be desirable when the components of the third layer, which functions to stabilize or protect the anode active layer comprising lithium, may be unstable to components present in the electrolyte. The fourth layer should be conductive to lithium ions, preferably nonporous to prevent penetration by electrolyte solvents, compatible with electrolyte and the third layer, and flexible enough to accommodate for volume changes in the layers observed during discharge and charge. The fourth layer should further be stable and preferably insoluble in the electrolyte. As the fourth layer is not directly in contact with the lithium layer, compatibility with metallic lithium is not necessary. Examples of suitable fourth layers include, but are not limited to, layers comprising organic or inorganic solid polymer electrolytes, electrically and ionically conducting polymers, and metals with certain lithium solubility properties.

In one embodiment, the fourth layer comprises a polymer layer, wherein the fourth layer is in contact with the third layer on the side opposite to the second layer. In one embodiment, the polymer of the fourth layer is selected from the group consisting of electrically conductive polymers, ionically conductive polymers, sulfonated polymers, and hydrocarbon polymers, as described herein for the third layer. Further examples of suitable polymers for use in the fourth layer of the present invention include, but are not limited to, crosslinked polymers, as described herein for the third layer, and those described in U.S. patent application Ser. No. 09/399,967 now U.S. Pat. No. 6,183,901 to Ying et al. of the common assignee for protective coating layers for separator layers. The polymer material of the third or fourth layer may further comprise one or more salts, for example, lithium salts, to enhance ionic conductivity.

In one embodiment, the fourth layer comprises a metal in which lithium is soluble, for example is able to form an alloy with, or able to diffuse or migrate through. Examples of suitable metals for the fourth layer include those selected from the group consisting of aluminum, zinc, magnesium, silver, lead, cadmium, bismuth, germanium, gallium, indium, and tin. Preferred metal are zinc, magnesium, tin and aluminum. The lithium content of such a metal layer is preferably in the range 0.5% by weight to about 20% by weight, and is dependent on, for example, the choice of metal, the desired lithium ion conductivity, and the desired flexibility of the layer.

The thickness of the fourth layer, which may be the outer layer of the anode layer, of the anode of the present invention is similar to those of the third layer and may vary over a wide range from about 5 to about 5000 nanometers. The thickness of the fourth layer is dependent on the thickness of the layer required to provide the desired beneficial effect of the layer while maintaining properties needed for cell construction, such as flexibility, low interfacial resistance, and stability to the electrolyte. In one embodiment, the thickness of the fourth layer is in the range of about 10 nanometers to 2000 nanometers. In one embodiment, the thickness of the fourth layer is in the range of about 10 nanometers to 1000 nanometers.

In one embodiment, the thickness of the fourth layer is in the range of about 50 nanometers to 1000 nanometers. In one embodiment, the thickness of the fourth layer is in the range of about 100 nanometers to 500 nanometers.

In other embodiments of the anode of the present invention, it may be desirable to deposit onto the fourth layer one or more other layers which further contribute to the stabilization of the lithium anode, as described in co-pending U.S. patent application Ser. No. 09/721,578 entitled "Lithium Anodes for Electrochemical Cells" to Skotheim et al. of the common assignee, filed on even day herewith The anode of the present invention may be assembled into cells by combining with an electrolyte and a cathode comprising a cathode active material, as described herein. The anodes may also be formed with other alkali or alkaline earth anode active metals by suitable choice of the temporary protective metal.

During subsequent storage of an anode of this invention, or during storage of an electrochemical cell into which an anode of this invention is assembled, or during electrochemical cycling of the cell comprising an anode of the present invention, the temporary protective metal layer is capable of forming an alloy with, dissolving into, blending with, or diffusing into the lithium metal to yield a single anode active layer comprising lithium metal. Lithium metal is known to alloy with certain metals as described herein, and has further been observed to diffuse or alloy with thin layers of certain other metals such as, for example, copper. In one embodiment, the metal of the temporary protective metal layer forms an alloy with the lithium metal of the first layer. In one embodiment, the metal of the temporary protective metal layer diffuses into the lithium metal of the first layer. The interdiffusion or alloying can be assisted by heating the anode assembly. Further, it has been found that alloying or diffusion of the temporary protective metal layer and lithium can be slowed or prevented by storage of the anode at low temperatures, such as at or below 0° C. This feature may be utilized in the method of preparing anodes of the present invention.

Methods of Making Anodes

Another aspect of the present invention pertains to a method of preparing an anode for use in an electrochemical cell, wherein the anode is formed by the steps of:

(a) depositing onto a substrate a first layer comprising lithium metal, or alternatively, providing a lithium metal foil as a first layer; and (b) depositing over the first layer a second layer of a temporary protective metal, wherein the temporary protective metal is selected from the group consisting of copper, magnesium, aluminum, silver, gold, lead, cadmium, bismuth, indium, germanium, gallium, zinc, tin, and platinum;

wherein the temporary protective metal is capable of forming an alloy with lithium metal or diffusing into lithium metal.

The method of the present invention may further comprise after step (b), a step (c) of depositing a third layer over the second layer formed in step (b), wherein the third layer comprises a single ion conducting layer, as described herein, or a polymer, as described herein.

The method of the present invention, may further comprise after step (c), a step (d) of depositing a fourth layer over the third layer, wherein the fourth layer is as described herein.

The layers of the anode of the present invention may be deposited by any of the methods known in the art, such as physical or chemical vapor deposition methods, extrusion, and electroplating. Examples of suitable physical or chemical vapor deposition methods include, but are not limited to, thermal evaporation (including, but not limited to, resistive, inductive, radiation, and electron beam heating), sputtering (including, but not limited to, diode, DC magnetron, RF, RF magnetron, pulsed, dual magnetron, AC, MF, and reactive), chemical vapor deposition, plasma enhanced chemical vapor deposition, laser enhanced chemical vapor deposition, ion plating, cathodic arc, jet vapor deposition, and laser ablation.

Preferably the deposition of the layers is carried out in a vacuum or inert atmosphere to minimize side reactions in the deposited layers which would introduce impurities into the layers or which may affect the desired morphology of the layers. It is also preferable that the first two layers are deposited in a continuous fashion in a multistage deposition apparatus. Preferably, the third layer is also deposited in a continuous fashion after the first two layers. However, the temporary protective metal layer will provide protection for the lithium layer if the third layer is deposited in a different apparatus.

Preferred methods for the deposition of the first layer comprising lithium metal are those selected from the group consisting of thermal evaporation, sputtering, jet vapor deposition, laser ablation, and extrusion. In one embodiment, the first layer is deposited by thermal evaporation. Alternatively, the first layers may comprise a lithium foil or lithium foil and a substrate which may be laminated together by a lamination process, as known in the art, to form the first layer.

Suitable methods for depositing the temporary protective metal layer include, but are not limited to, thermal evaporation, sputtering, jet vapor deposition, and laser ablation. In one embodiment, the temporary protective metal layer is deposited by thermal evaporation or sputtering.

The third layer, comprising a single ion conducting layer or a polymer layer, may be deposited from either precursor moieties or from the material of the layer, as known in the art.

In one embodiment, the single ion conducting layer is deposited by a method selected from the group consisting of sputtering, electron beam evaporation, vacuum thermal evaporation, laser ablation, chemical vapor deposition, thermal evaporation, plasma enchanced chemical vacuum deposition, laser enhanced chemical vapor deposition, and jet vapor deposition.

In one embodiment, the polymer layer is deposited by a method selected from the group consisting of electron beam evaporation, vacuum thermal evaporation, laser ablation, chemical vapor deposition, thermal evaporation, plasma assisted chemical vacuum deposition, laser enhanced chemical vapor deposition, jet vapor deposition, sputtering, and extrusion. Other methods for the deposition of the polymer layers of the present invention, include, but are not limited to, flash evaporation methods, for example, as described in U.S. Pat. No. 4,954,371 to Yializis. A preferred method for deposition of polymer layers comprising lithium salts is a flash evaporation method, for example, as described in U.S. Pat. No 5,681,615 to Affinito et al. Flash evaporation methods are particularly useful for the deposition of crosslinked polymer layers. The polymer layer may also be deposited by spin coating methods.

Similarly, a fourth layer may be deposited from either precursor moieties or from the material of the layer, by the methods as described.

Electrochemical Cells

The present invention provides an electrochemical cell comprising:
(a) a cathode comprising a cathode active material;
(b) an anode; and
(c) a non-aqueous electrolyte interposed between the cathode and the anode;
wherein said anode comprises an anode active layer, which anode active layer comprises:
(i) a first layer comprising lithium metal; and
(ii) a second layer of a temporary protective metal in contact with a surface of the first layer;
wherein the temporary protective metal is capable of forming an alloy with lithium metal or is capable of diffusing into lithium metal.

In one embodiment, the metal of the temporary protective layer is selected from the group of copper, magnesium, aluminum, silver, gold, lead, cadmium, bismuth, indium, germanium, gallium, zinc, tin, and platinum.

The temporary protective metal layer of the anode active layer may alloy with, dissolve into, blend with, or diffuse into with the lithium metal of the first layer prior to the electrochemical cycling of the cell, or alternatively, during the electrochemical cycling of a cell. The alloying or diffusion of the temporary protective metal layer with the lithium metal layer prior to cycling the cell may occur on storage of the cell after assembly, and may be controlled by the storage temperature of the cell. For example, it may be accelerated by storage at elevated temperatures.

The anode of the cells of the present invention may further comprise a third or a fourth layer, as described herein.

Suitable cathode active materials for use in the cathodes of the electrochemical cells of the present invention include, but are not limited to, electroactive transition metal chalcogenides, electroactive conductive polymers, and electroactive sulfur-containing materials, and combinations thereof As used herein, the term "chalcogenides" pertains to compounds that contain one or more of the elements of oxygen, sulfur, and selenium. Examples of suitable transition metal chalcogenides include, but are not limited to, the electroactive oxides, sulfides, and selenides of transition metals selected from the group consisting of Mn, V, Cr, Ti, Fe, Co, Ni, Cu, Y, Zr, Nb, Mo, Ru, Rh, Pd, Ag, Hf, Ta, W, Re, Os, and Ir. In one embodiment, the transition metal chalcogenide is selected from the group consisting of the electroactive oxides of nickel, manganese, cobalt, and vanadium and the electroactive sulfides of iron. In one embodiment, the cathode active layer comprises an electroactive conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes. Preferred conductive polymers are polypyrroles, polyanilines, and polyacetylenes.

In one embodiment, the cathode active material comprises an electroactive sulfurcontaining material. The term "electroactive sulfur-containing material," as used herein, relates to cathode active materials which comprise the element sulfur in any form, wherein the electrochemical activity involves the breaking or forming of sulfur-sulfur covalent bonds. Suitable electroactive sulfur-containing materials, include, but are not limited to, elemental sulfur and organic materials comprising sulfur atoms and carbon atoms, which may or may not be polymeric. Suitable organic materials include those further comprising heteroatoms, conductive polymer segments, composites, and conductive polymers.

In one embodiment, the electroactive sulfur-containing material comprises elemental sulfur. In one embodiment, the electroactive sulfur-containing material comprises a mixture of elemental sulfur and a sulfur-containing polymer.

In one embodiment, the sulfur-containing material, in its oxidized form, comprises a polysulfide moiety, $S_m$, selected from the group consisting of covalent $—S_m—$ moieties, ionic $—S_m^-$ moieties, and ionic $S_m^{2-}$ moieties, wherein m is an integer equal to or greater than 3. In one embodiment, m of the polysulfide moiety, $S_m$, of the sulfur-containing polymer is an integer equal to or greater than 6. In one embodiment, m of the polysulfide moiety, $S_m$, of the sulfur-containing polymer is an integer equal to or greater than 8. In one embodiment, the sulfur-containing material is a sulfur-containing polymer. In one embodiment, the sulfur-containing polymer has a polymer backbone chain and the polysulfide moiety, $S_m$, is covalently bonded by one or both of its terminal sulfur atoms as a side group to the polymer backbone chain. In one embodiment, the sulfur-containing polymer has a polymer backbone chain and the polysulfide moiety, $S_m$, is incorporated into the polymer backbone chain by covalent bonding of the terminal sulfur atoms of the polysulfide moiety.

In one embodiment, the electroactive sulfur-containing material comprises greater than 50% by weight of sulfur. In a preferred embodiment, the electroactive sulfur-containing material comprises greater than 75% by weight of sulfur. In a more preferred embodiment, the electroactive sulfur-containing material comprises greater than 90% by weight of sulfur.

The nature of the electroactive sulfur-containing materials useful in the practice of this invention may vary widely, as known in the art.

Examples of sulfur-containing polymers include those described in: U.S. Pat. Nos. 5,601,947 and 5,690,702 to Skotheim et al.; U.S. Pat. Nos. 5,529,860 and 6,117,590 to Skotheim et al.; and U.S. patent application Ser. No. 08/995, 122 now U.S. Pat. No. 6,201,100 to Gorkovenko et al. of the common assignee, and PCT Publication No. 99/33130. Other suitable electroactive sulfurcontaining materials comprising polysulfide linkages are described in U.S. Pat. No. 5,441,831 to Skotheim et al.; U.S. Pat. No. 4,664,991 to Perichaud et al., and in U.S. Pat. Nos. 5,723,230, 5,783,330, 5,792,575 and 5,882,819 to Naoi et al. Still further examples of electroactive sulfur-containing materials include those comprising disulfide groups as described, for example in, U.S. Pat. No. 4,739,018 to Armand el al.; U.S. Pat. Nos. 4,833,048 and 4,917,974, both to De Jonghe et al.; U.S. Pat. Nos. 5,162,175 and 5,516,598, both to Visco et al.; and U.S. Pat. No. 5,324,599 to Oyama et al.

The cathodes of the cells of the present invention may further comprise one or more conductive fillers to provide enhanced electronic conductivity. Examples of conductive fillers include, but are not limited to, those selected from the group consisting of conductive carbons, graphites, activated carbon fibers, non-activated carbon nanofibers, metal flakes, metal powders, metal fibers, carbon fabrics, metal mesh, and electrically conductive polymers. The amount of conductive filler, if present, is preferably in the range of 2 to 30% by weight of the cathode active layer. The cathodes may also further comprise other additives including, but not limited to, metal oxides, aluminas, silicas, and transition metal chalcogenides.

The cathodes of the cells of the present invention may also comprise a binder. The choice of binder material may vary widely so long as it is inert with respect to the other materials in the cathode. Useful binders are those materials, usually polymeric, that allow for ease of processing of battery electrode composites and are generally known to those skilled in the art of electrode fabrication. Examples of useful binders include, but are not limited to, those selected from the group consisting of polytetrafluoroethylenes (Teflon®), polyvinylidene fluorides ($PVF_2$ or PVDF), ethylene-propylene-diene (EPDM) rubbers, polyethylene oxides (PEO), UV curable acrylates, UV curable methacrylates, and heat curable divinyl ethers, and the like. The amount of binder, if present, is preferably in the range of 2 to 30% by weight of the cathode active layer.

The cathodes of the cells of the present invention may further comprise a current collector as is known in the art. Current collectors are useful in efficiently collecting the electrical current generated throughout the cathode and in providing an efficient surface for attachment of the electrical contacts leading to the external circuit as well as functioning as a support for the cathode. Examples of useful current collectors include, but are not limited to, those selected from the group consisting of metallized plastic films, metal foils, metal grids, expanded metal grids, metal mesh, metal wool, woven carbon fabric, woven carbon mesh, non-woven carbon mesh, and carbon felt.

Cathodes of the cells of the present invention may be prepared by methods known in the art. For example, one suitable method comprises the steps of: (a) dispersing or suspending in a liquid medium the electroactive sulfur-containing material, as described herein; (b) optionally adding to the mixture of step (a) a conductive filler, binder, or other cathode additives; (c) mixing the composition resulting from step (b) to disperse the electroactive sulfur-containing material; (d) casting the composition resulting from step (c) onto a suitable substrate; and (e) removing some or all of the liquid from the composition resulting from step (d) to provide the cathode.

Examples of suitable liquid media for the preparation of the cathodes of the present invention include aqueous liquids, non-aqueous liquids, and mixtures thereof. Especially preferred liquids are non-aqueous liquids such as, for example, methanol, ethanol, isopropanol, propanol, butanol, tetrahydrofuran, dimethoxyethane, acetone, toluene, xylene, acetonitrile, and cyclohexane.

Mixing of the various components can be accomplished using any of a variety of methods known in the art, so long as the desired dissolution or dispersion of the components is obtained. Suitable methods of mixing include, but are not limited to, mechanical agitation, grinding, ultrasonication, ball milling, sand milling, and impingement milling.

The formulated dispersions can be applied to substrates by any of a variety of coating methods known in the art and then dried using techniques, known in the art, to form the solid cathodes of the lithium cells of this invention. Suitable hand coating techniques include, but are not limited to, the use of a wire-wound coating rod or gap coating bar. Suitable machine coating methods include, but are not limited to, the use of roller coating, gravure coating, slot extrusion coating, curtain coating, and bead coating. Removal of some or all of the liquid from the mixture can be accomplished by any of a variety of means known in the art. Examples of suitable methods for the removal of liquid from the mixture include, but are not limited to, hot air convection, heat, infrared radiation, flowing gases, vacuum, reduced pressure, and by simply air drying.

The method of preparing the cathodes of the present invention may further comprise heating the electroactive sulfur-containing material to a temperature above its melting point and then resolidifying the melted electroactive sulfur-containing material to form a cathode active layer having a reduced thickness and a redistributed sulfur-containing material of higher volumetric density than before the melting process.

The electrolytes used in electrochemical or battery cells function as a medium for the storage and transport of ions, and in the special case of solid electrolytes and gel electrolytes, these materials may additionally function as a separator between the anode and the cathode. Any liquid, solid, or gel material capable of storing and transporting ions may be used, so long as the material is electrochemically and chemically unreactive with respect to the anode and the cathode, and the material facilitates the transport of lithium ions between the anode and the cathode. The electrolyte must also be electronically non-conductive to prevent short circuiting between the anode and the cathode.

Typically, the electrolyte comprises one or more ionic electrolyte salts to provide ionic conductivity and one or more non-aqueous liquid electrolyte solvents, gel polymer materials, or polymer materials. Suitable non-aqueous electrolytes for use in the present invention include, but are not limited to, organic electrolytes comprising one or more materials selected from the group consisting of liquid electrolytes, gel polymer electrolytes, and solid polymer electrolytes. Examples of non-aqueous electrolytes for lithium batteries are described by Dominey in *Lithium Batteries, New Materials, Developments and Perspectives*, Chapter 4, pp. 137–165, Elsevier, Amsterdam (1994). Examples of gel polymer electrolytes and solid polymer electrolytes are described by Alamgir et al. in *Lithium Batteries, New Materials, Developments and Perspectives*, Chapter 3, pp. 93–136, Elsevier, Amsterdam (1994).

Examples of useful non-aqueous liquid electrolyte solvents include, but are not limited to, non-aqueous organic solvents, such as, for exanple, N-methyl acetamide, acetonitrile, acetals, ketals, esters, carbonates, sulfones, sulfites, sulfolanes, aliphatic ethers, cyclic ethers, glymes, polyethers, phosphate esters, siloxanes, dioxolanes, N-alkylpyrrolidones, substituted forms of the foregoing, and blends thereof. Fluorinated derivatives of the foregoing are also useful as liquid electrolyte solvents.

Liquid electrolyte solvents are also useful as plasticizers for gel polymer electrolytes. Examples of useful gel polymer electrolytes include, but are not limited to, those comprising one or more polymers selected from the group consisting of polyethylene oxides, polypropylene oxides, polyacrylonitriles, polysiloxanes, polyimides, polyphosphazenes, polyethers, sulfonated polyimides, perfluorinated membranes (NAFION™ resins), polydivinyl polyethylene glycols, polyethylene glycol diacrylates, polyethylene glycol dimethacrylates, derivatives of the foregoing, copolymers of the foregoing, crosslinked and network structures of the foregoing, and blends of the foregoing, and optionally, one or more plasticizers.

Examples of useful solid polymer electrolytes include, but are not limited to, those comprising one or more polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing.

In addition to electrolyte solvents, gelling agents, and polymers as known in the art for forming non-aqueous electrolytes, the non-aqueous electrolyte may further comprise one or more ionic electrolyte salts, also as known in the art, to increase the ionic conductivity.

Examples of ionic electrolyte salts for use in the electrolytes in the present invention include, but are not limited to, LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, LiN(SO$_2$CF$_3$)$_2$,

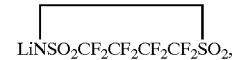

and the like. Other electrolyte salts useful in the practice of this invention include lithium polysulfides (Li$_2$S$_x$), and lithium salts of organic ionic polysulfides (LiS$_x$R)$_n$, where x is an integer from 1 to 20, n is an integer from 1 to 3, and R is an organic group, and those disclosed in U.S. Pat. No. 5,538,812 to Lee et al. Preferred ionic electrolyte salts are LiBr, LiI, LiSCN, LiBF$_4$, LiPF$_6$, LiAsF$_6$, LiSO$_3$CF$_3$, LiN (SO$_2$CF$_3$)$_2$, LiC(SO$_2$CF$_3$)$_3$, (LiS$_x$)$_z$R, and Li$_2$S$_x$, where x is an integer from 1 to 20, z is an integer from 1 to 3, and R is an organic group.

The electrochemical cells of the present invention may further comprise a separator interposed between the cathode and anode. Typically, the separator is a solid non-conductive or insulative material which separates or insulates the anode and the cathode from each other preventing short circuiting, and which permits the transport of ions between the anode and the cathode.

The pores of the separator may be partially or substantially filled with electrolyte. Separators may be supplied as porous free standing films which are interleaved with the anodes and the cathodes during the fabrication of cells. Alternatively, the porous separator layer may be applied directly to the surface of one of the electrodes, for example, as described in PCT Publication No. WO 99/33125 to Carlson et al. and in U.S. Pat. No. 5,194,341 to Bagley et al.

A variety of separator materials are known in the art. Examples of suitable solid porous separator materials include, but are not limited to, polyolefins, such as, for example, polyethylenes and polypropylenes, glass fiber filter papers, and ceramic materials. Further examples of separators and separator materials suitable for use in this invention are those comprising a microporous xerogel layer, for example, a microporous pseudo-boehmite layer, which may be provided either as a free standing film or by a direct coataing application on one of the electrodes as described in U.S. patent application Ser. Nos. 08/995,089 now U.S. Pat. No. 6,153,337 and Ser. No. 09/215,112 now U.S. Pat. No. 6,306,545 by Carlson et al. of the common assignee. Solid electrolytes and gel electrolytes may also function as a separator in addition to their electrolyte function.

In one embodiment, the solid porous separator is a porous polyolefin separator. In one embodiment, the solid porous separator comprises a microporous xerogel layer. In one embodiment, the solid porous separator comprises a microporous pseudo-boehmite layer.

Battery cells of the present invention may be made in a variety of sizes and configurations as known to those skilled in the art. These battery design configurations include, but are not limited to, planar, prismatic, jelly roll, w-fold, stacked and the like.

The electrochemical cells comprising the anodes of the present invention may be either primary or secondary batteries or cells.

Another aspect of the present invention pertains to a method of forming an electrochemical cell, the method comprising the steps of: (i) providing a cathode; (ii) providing an anode, as described herein; and, (iii) interposing an electrolyte between the anode and the cathode.

EXAMPLES

Several embodiments of the present invention are described in the following examples, which are offered by way of illustration and not by way of limitation.

Example 1

A vacuum web coating system located in a dry room, having an unwind drive, liquid cooled drum, load cell rollers for controlling tension, a rewind drive, and two deposition zones, was loaded with an anode substrate of 23 μm PET metallized on one side with 100 nm of copper. The chamber was evacuated to $10^{-6}$ Torr. Lithium was deposited on to the substrate by first heating a thermal evaporation Li source to 550° C. to allow significant evaporation, and then starting the web drive at 1.2 feet per minute. The lithium evaporation was allowed to stabilize to give an 8 μm coating of lithium on the copper of the substrate layer (PET/Cu/Li). The DC magnetron sputtering source zone, positioned after the lithium source, was brought up to 2.4 mTorr while bringing the lithium evaporation zone only up to $10^{-5}$ torr. The sputtering source was given 2 kW power and copper was deposited on top of the lithium layer to a thickness of either 120, 60 or 30 nm to give a composite anode of PET/Cu/Li/Cu. The web was removed from the coating system in the dry room.

A PET/Cu/Li/Cu composite anode, with a 120 nm temporary copper protective layer and a comparative PET/Cu/Li anode were tested for reactivity to isopropyl alcohol by placing a sample in a dish and covering it with alcohol. While the lithium without the copper temporary protective coating reacted quickly, the temporary protective copper coated lithium was observed not to significantly react.

Visual observations of lithium/Cu layers showed that lithium with a 120 nm temporary copper protective layer was stable for storage overnight under vacuum at room temperature. When this sample was heated in an oven at about 90° C., the pink coloration of the copper layer disappeared as the copper and lithium layers inter-diffused, alloyed, or mixed. A similar sample placed in a freezer at about −15° C. still retained its pink color after 11 months. Samples with copper layers of 30 or 60 nm of copper were less stable, with the copper coloration disappearing after storage overnight.

Example 2

Three copper protected lithium anodes were formed by coating copper onto the lithium surface of a PET/copper/lithium anode structure as described in Example 1. The thickness of the coated copper layers on the outer surface of the lithium were 30, 60 and 120 nanometers. The copper protected lithium anodes were stored at room temperature overnight.

Small flat cells were assembled from the copper protected lithium anodes (PET/copper/lithium/copper) or uncoated PET/copper/lithium anodes as a control, with a cathode prepared by coating a mixture of 75 parts of elemental sulfur (available from Aldrich Chemical Company, Milwaukee, Wis.), 15 parts of a conductive carbon pigment PRINTEX XE-2 (a trademark for a carbon pigment available from Degussa Corporation, Akron, Ohio), and 10 parts of PYROGRAF-III (a tradename for carbon filaments available from Applied Sciences, Inc., Cedarville, Ohio) dispersed in isopropanol onto one side of a 17 micron thick conductive carbon coated aluminum foil substrate (Product No. 60303 available from Rexam Graphics, South Hadley, Mass.). After drying, the coated cathode active layer thickness was about 30 microns and the loading of sulfur in the cathode active layer was 1.07 mg/cm$^2$. The electrolyte was a 1.4 M solution of lithium bis(trifluoromethylsulfonyl)imide, (lithium imide, available from 3M Corporation, St. Paul, Minn.) in a 40:55:5 volume ratio mixture of 1,3-dioxolane, dimethoxyethane, and tetraethyleneglycol divinylether. The porous separator used was 16 micron E25 SETELA (a trademark for a polyolefin separator available from Tonen Chemical Corporation, Tokyo, Japan, and also available from Mobil Chemical Company, Films Division, Pittsford, N.Y.). The active area of the cathode and anode in the small flat cells was 25 cm$^2$.

The assembled cells were stored for 2 weeks at room temperature during which the impedance was periodically measured. The high frequency impedance (175 KHz) was found to be equal for both the control cells and the cells with copper protected lithium surfaces, irrespective of the thickness of the copper protective layer, and was representative of the conductivity of the electrolyte in the porous Tonen separator, about 10.9 ohm Cm$^2$.

Initial measurements of the low frequency impedance (80 Hz) was observed to be different for the control and copper protected lithium anodes, and was dependent on the thickness of the copper protective layer and storage time. Storage time measurements showed that the cells with a 30 nm copper protective layer had a impedance 20% higher than the control cell, while the impedance was 200% higher for cells with 60 nm copper protective layers and 500% higher for cells with 120 run copper protective layers. The impedance for fresh control cells was around 94 ohm cm$^2$.

During storage of the cells with copper protected lithium, the impedance decreased and became equal to that of the control cells in two days for cells for 30 nm Cu, in 5 days for cells with 60 nm Cu, and in 14 days for cells with 120 nm Cu protective layers.

After storage, all cells were discharged at a current density of 0.4 mA/cm$^2$ and a voltage cutoff 1.25 V. The delivered capacities were found to be equal for the control cells and the cells with temporary copper protective layers, showing that the temporary Cu layers disappeared in about two weeks and did not prevent electrochemical cycling or reduce the cell performance.

While the invention has been described in detail and with reference to specific and general embodiments thereof, it will be apparent to one skilled in the art that various changes and modifications can be made therein without departing from the spirit and scope thereof.

What is claimed is:

1. An anode of an electrochemical cell, wherein said anode comprises:
   an anode active layer, which anode active layer comprises:
   (i) a first layer comprising lithium metal;
   (ii) a second layer of atemporary protective metal in contact with a surface of said first layer; and
   (iii) a third layer comprising a single ion conducting layer, wherein said third layer is in contact with said second layer on the side opposite to said first layer and wherein said single ion conducting layer comprises a glass selected from the group consisting of lithium silicates, lithium borates, lithium aluminates, lithium phosphates, lithium phosphorus oxynitrides, lithium silicosulfides, lithium permanosulfides, lithium lanthanum oxides, lithium tantalum oxides, lithium niobium oxides, lithium titanium oxides, lithium borosulfides, lithium aluminosulfides, and lithium phosphosulfides, and combinations thereof.

2. The anode of claim 1, wherein said temporary protective metal is selected from the group consisting of copper, magnesium, aluminum, silver, gold, lead, cadmium, bismuth, indium, germanium, gallium, zinc, tin, and platinum.

3. The anode of claim 1, wherein the thickness of said first layer is 2 to 100 microns.

4. The anode of claim 1, wherein the thickness of said second layer is 5 to 500 nanometers.

5. The anode of claim 1, wherein the thickness of said second layer is 20 to 200 nanometers.

6. The anode of claim 1, wherein said anode further comprises a substrate, wherein said substrate is in contact with a surface of said first layer on the side opposite to said second layer.

7. The anode of claim 6, wherein said substrate comprises a current collector.

8. The anode of claim 6, wherein said substrate is selected from the group consisting of metal foils, polymer films, metallized polymer films, electrically conductive polymer films, polymer films having an electrically conductive coating, electrically conductive polymer films having an electrically conductive metal coating, and polymer films having conductive particles dispersed therein.

9. The anode of claim 1, wherein said anode further comprises a fourth layer, said fourth layer comprising a polymer, and wherein said fourth layer is in contact with said third layer on the side opposite to said second layer.

10. The anode of claim 9, wherein said polymer is selected from the group consisting of electrically conductive polymers, ionically conductive polymers, sulfonated polymers, and hydrocarbon polymers.

11. The anode of claim 9, wherein said polymer is a crosslinked polymer.

12. An electrochemical cell comprising:
(a) a cathode comprising a cathode active material;
(b) an anode; and
(c) a non-aqueous electrolyte interposed between said anode and said cathode;
wherein said anode comprises an anode active layer, which anode active layer comprises:
(i) a first layer comprising lithium metal;
(ii) a second layer of a temporary protective metal in contact with a surface of said first layer; and
(iii) a third layer comprising a single ion conducting layer, wherein said third layer is in contact with said second layer on the side opposite to said first layer and wherein said single ion conducting layer of said third layer comprises a glass selected from the group consisting of lithium silicates, lithium borates, lithium aluminates, lithium phosphates, lithium phosphorus oxynitrides, lithium silicosulfides, lithium permanosulfides, lithium lanthanum oxides, lithium tantalum oxides, lithium niobium oxides, lithium titanium oxides, lithium borosulfides, lithium aluminosulfides, and lithium phosphosulfides, and combinations thereof.

13. The cell of claim 12, wherein said temporary protective metal is selected from the group consisting of copper, magnesium, aluminum, silver, gold, lead, cadmium, bismuth, indium, germanium, gallium, zinc, tin, and platinum.

14. The cell of claim 12, wherein said temporary protective metal is characterized by forming an alloy with, dissolving into, blending with, or diffusing into said lithium metal of said first layer during electrochemical cycling of said cell.

15. The cell of claim 12, wherein said temporary protective metal is characterized by forming an alloy with, dissolving into, blending with, or diffusing into said lithium metal of said first layer prior to electrochemical cycling of the cell.

16. The cell of claim 12, wherein the thickness of said first layer is 2 to 100 microns.

17. The cell of claim 12, wherein the thickness of said second layer is 5 to 500 nanometers.

18. The cell of claim 12, wherein said anode further comprises a substrate, wherein said substrate is in contact with a surface of said first layer on the side opposite to said second layer.

19. The cell of claim 18, wherein said substrate comprises a current collector.

20. The cell of claim 18, wherein said substrate is selected from the group consisting of metal foils, polymer films, metallized polymer films, electrically conductive polymer films, polymer films having an electrically conductive coating, electrically conductive polymer films having an electrically conductive metal coating, and polymer films having conductive particles dispersed therein.

21. The cell of claim 12, wherein said anode further comprises a fourth layer, said fourth layer comprising a polymer, and wherein said fourth layer is in contact with said third layer on the side opposite to said second layer.

22. The cell of claim 21, wherein said polymer is selected from the group consisting of electrically conductive polymers, ionically conductive polymers, sulfonated polymers, and hydrocarbon polymers.

23. The cell of claim 21, wherein said polymer is a crosslinked polymer.

24. The cell of claim 12, wherein said electrolyte is selected from the group consisting of liquid electrolytes, solid polymer electrolytes and gel polymer electrolytes.

25. The cell of claim 12, wherein said electrolyte comprises a separator selected from the group consisting of polyolefin separators and microporous xerogel layer separators.

26. The cell of claim 12, wherein said cathode active material comprises one or more materials selected from the group consisting of electroactive metal chalcogenides, electroactive conductive polymers, and electroactive sulfur-containing materials, and combinations thereof.

27. The cell of claim 12, wherein said cathode active material comprises elemental sulfur.

28. The cell of claim 12, wherein said cathode active material comprises an electroactive sulfur-containing organic polymer, wherein said sulfur-containing organic polymer, in its oxidized state, comprises one or more polysulfide moieties, —$S_m$—, where m is an integer equal to or greater than 3.

29. The cell of claim 12, wherein said cathode active material comprises an electroactive sulfur-containing organic polymer, wherein said sulfur-containing organic polymer, in its oxidized state, comprises one or more polysulfide moieties, —$S_m^-$, where m is an integer equal to or greater than 3.

30. The cell of claim 12, wherein said cathode active material comprises an electroactive sulfur-containing organic polymer, wherein said sulfur-containing organic polymer, in its oxidized state, comprises one or more polysulfide moieties, $S_m^{2-}$, where m is an integer equal to or greater than 3.

31. The cell of claim 12, wherein said cell is a secondary cell.

32. The cell of claim 12, wherein said cell is a primary cell.

* * * * *